Patented June 3, 1930

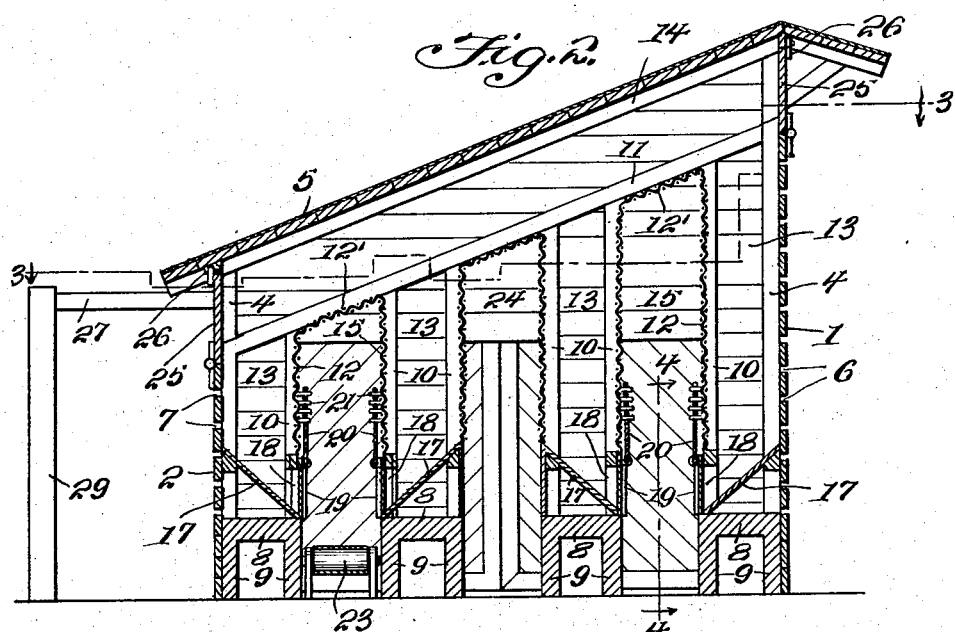

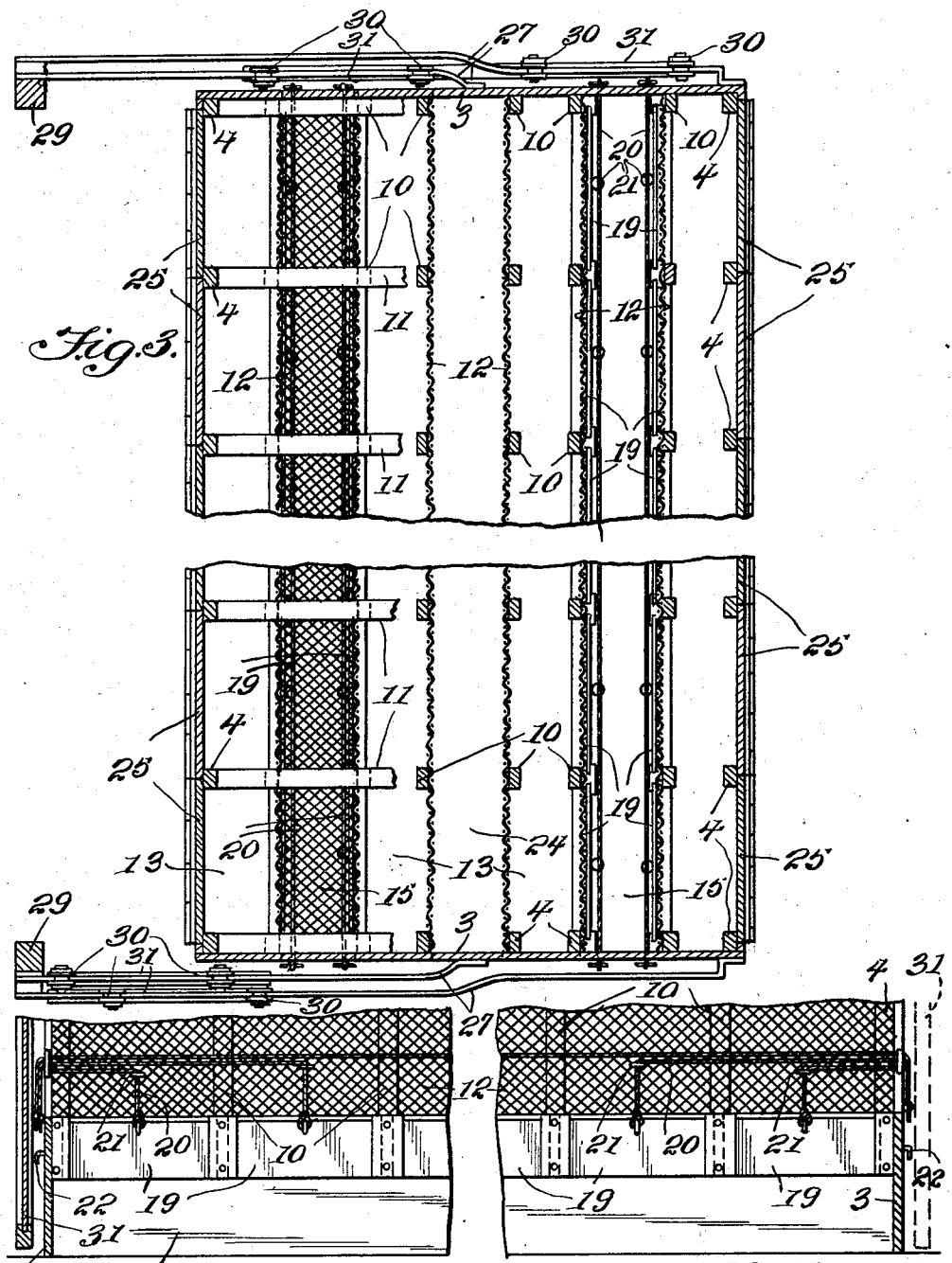

1,762,019

UNITED STATES PATENT OFFICE

MARY K. JANDL, OF MARBLE ROCK, IOWA

CORNCRIB

Application filed January 20, 1928. Serial No. 248,199.

My present invention has reference to a corn storage house or crib in which corn husked in a field may be stored in a manner whereby air will be permitted to circulate therethrough, thereby preventing the spoiling of the corn, and further wherein the corn will gravitate from the several compartments or bins in the crib or house upon the opening of vertically movable doors and such corn may, if desired, be directed upon a conveyor that leads to a corn sheller.

A further object is the provision of a corn storage house or crib that is simply constructed to include vertically arranged longitudinally disposed compartments provided with open tops which are spaced from the top of the house, the confronting sides of the compartments being covered by reticulated facings, which facings also extend over the spaces between the compartments, the ends of the house being provided with openings that register with the spaces between the compartments, the front and rear of the house being provided with air openings that communicate with the end compartments, the bottom of the compartments being angularly disposed and vertically movable doors control openings in the compartments, slidable doors being arranged in the ends of the house for covering or uncovering the spaces or passageways between the compartments, while the top of the house, directly above the compartments, is provided with doors for the passage of corn into the several compartments.

To the attainment of the foregoing and other objects which will present themselves as the nature of the invention is better understood, the invention consists in the improvement as hereinafter described and definitely claimed.

In the drawings:

Figure 1 is a side elevation of a corn storage house or crib in accordance with this invention.

Figure 2 is an approximately central longitudinal sectional view therethrough.

Figure 3 is a horizontal sectional view approximately on the line 3—3 of Figure 2.

Figure 4 is a sectional view approximately on the line 4—4 of Figure 2.

Figure 5 is a detail sectional view to illustrate diagrammatically the arrangement of the corn in the house or crib.

My improved corn storage house or crib may be of any desired size and may, of course, be constructed of any desired material. In the showing of the drawings, the house is, in the main, constructed of wood. The house includes a front 1, a back 2 and sides 3. The boards constituting the front, back and sides are nailed to suitable uprights in the nature of studs 4. The top of the house is disposed at an angle and is for distinction indicated by the numeral 5. The top 5 projects a suitable distance beyond the front and back, and if desired may also project beyond the sides 3 of the house. The boards providing the front and back are slightly spaced apart from each other, thus providing the same with longitudinally extending air inlets 6 and 7, respectively.

In the showing of the drawing, I arrange in the house, between the sides 3, base members, each of which includes a flat top 8 and depending sides 9 to provide the inverted U-shape in cross section configuration as best shown in Figure 2. One of these base members is arranged in abutment with the inner face of the front 1 and the back 2, the remaining base members being spaced from these mentioned base members and from each other. Nailed or otherwise secured to the inner corners of the end base members and to both of the corners of the intermediate base members there are uprights in the nature of studs 10. These studs 10 vary in length from the front to the rear of the house and the angle top portions of the said studs have nailed or otherwise secured thereto beams 11 which may be termed ceiling joists. The beams 11 are also secured to the uprights or studding 4 at the front and rear of the house. The uprights 10 have secured on their confronting faces sheets of a reticulated material 12, the said sheets being preferably bent upon themselves at their upper corners and extended below and secured to the beams 11, as indicated by the numerals 12'. In this manner it will be seen that the reticulated facings provide the interior of the house with equidistantly spaced corn receiving bins or compartments 13, and that the upper portions of these compartments are open. It is to be noted that the beams 11 are disposed a considerable distance below the rafter 14 that supports the top 5 of the house. It is to be also noted that inner air spaces 15 are provided between the confronting faces of each of the compartments 13, and the sides 3 of the house are provided with openings 16 that communicate with these spaces 15.

Each of the compartments 13 is provided with an inclined bottom 17. By reference to Figure 2 of the drawings it will be noted that the bottom walls 17 of the end compartments and the intermediate compartments, adjacent to the said end compartments are inclined toward the end passageways or spaces 15 for the house. Also by reference to the drawings it will be seen that these confronting faces of the compartments, at and a suitable distance from the bottom thereof, are provided with openings 18 and that vertically slidable doors or valves 19 normally close these openings. The doors or valves 19 are in the nature of flat plates and are, of course, arranged in suitable guideways. These doors have connected thereto flexible elements 20 that are passed through suitable guide eyes or sheaves 21 and are from thence directed to one of the ends of the house, the said flexible elements being engaged by suitable catch means 22 in the outer passageways adjacent to the sides of the house. The outer passageways, below the openings 18, may and preferably have arranged therein conveyors 23 whereby corn permitted to gravitate through the openings thereonto may be conveyed to a corn sheller. The intermediate passageway is indicated for distinction by the numeral 24 and this passageway affords only an air space or duct for the confronting sides of the intermediate compartments 13.

Above the outer compartments 13, the front and back of the house are provided with openings which, however, are normally closed by hinged doors 25, respectively, the said doors swinging downwardly and being normally engaged by latches 26. When the door at the front of the house is open the corn is directed into the compartment 13 next to the said front. When this compartment is filled the corn will slide over the inclined top of the air duct or passageway 15 between this compartment and the adjacent compartment, filling the last mentioned compartment. After this compartment is filled the corn will slide over the top of the intermediate passageway or air duct 24 into the second intermediate compartment and when this compartment is filled the corn will slide over the top of the next air duct or passageway to fill the rear compartment. When all of the compartments are filled, the space between the beams 11 and the top of the house will be also filled with corn as disclosed by the diagram in Figure 5. It is merely necessary for the operator to draw on the flexible elements to open the door of any desired compartment. Preferably each compartment is provided with two doors, either of which may, of course, be independently operated. The doors are of sufficient weight to gravitate to closed position. As far as the description has progressed it will be noted that I have provided a simple construction for storing a comparatively large quantity of corn and for protecting the same from weather conditions but at the same time allowing a free circulation through the corn to preserve the same. It will be further noted that the corn may be delivered in any desired quantity from any of the compartments and still further it is to be noted that the construction is proof against rats, mice or like animals.

Arranged upon the sides 3 of the house there are suitable elevated tracks 27 arranged in the same plane but in spaced pairs. The inner end of each pair of tracks is secured to the sides of the house and the upper ends thereof are fixed upon suitable uprights 29. The tracks 27 are provided for rollers 30 upon slidable doors 31. These doors, when moved to one position will close the openings 16 that communicate with the air ducts and passageways 15 and 24 and when moved to a second position will uncover such openings. By this simple arrangement it will be seen that a free circulation of air will be directed through the corn storage house or crib during mild weather and when the doors are closed they are disposed in close relation with the sides 3 of the house to prevent the entrance of moisture, snow, etc., through the openings during inclement weather.

The floors of the cribs from which the corn gravitates when the valves or doors are open onto the drag elevator or conveyor to the corn sheller are at least 14 inches from the ground to permit of the free gravitation of the corn onto the elevators. The drag elevators are at least 12 inches from the ground or floor surface of the improvement.

It is believed that the construction and advantages thereof will be understood and appreciated by those skilled in the art to which such invention relates when the foregoing description has been carefully read in connection with the accompanying drawings, but obviously I do not wish to be restricted to the precise details herein set forth and, therefore, hold myself entitled to make such changes therefrom as fairly fall within the scope of what I claim.

Having described the invention, I claim:

A corn storage house comprising a pitched roof, spaced slats included in the front and rear walls of said house, the sides being closed and provided with vertically arranged openings, parallel base members of U-shaped cross section disposed between and at the opposite sides of said openings, angle beams arranged in spaced parallelism with respect to the roof and below the same, uprights connected at the angle beams and rising from the base members, reticulated sheets secured to the confronting faces of pairs of the uprights and to the lower portions of the angle beams between the uprights to provide independent bins, each of said bins having an angle wall directed toward passages provided between the bins, the portions of the sheets secured to the angle beams providing guides for corn, slidably mounted gravity closed doors for openings aligned with the angle walls and disposed in the bins, remote means to operate said doors, the front and rear of the house above the bins being provided with openings, the opening of the front being adapted to receive corn to be passed by gravity to the bins through openings in the tops of the latter, doors for the first mentioned openings, doors for the openings in the front and rear of the house and said first mentioned openings being aligned with the passages between the bins.

In testimony whereof I affix my signature.

MARY K. JANDL.